April 9, 1957    W. E. BRILL    2,787,994
ENGINE SUPPORT
Filed Nov. 8, 1954    3 Sheets-Sheet 2
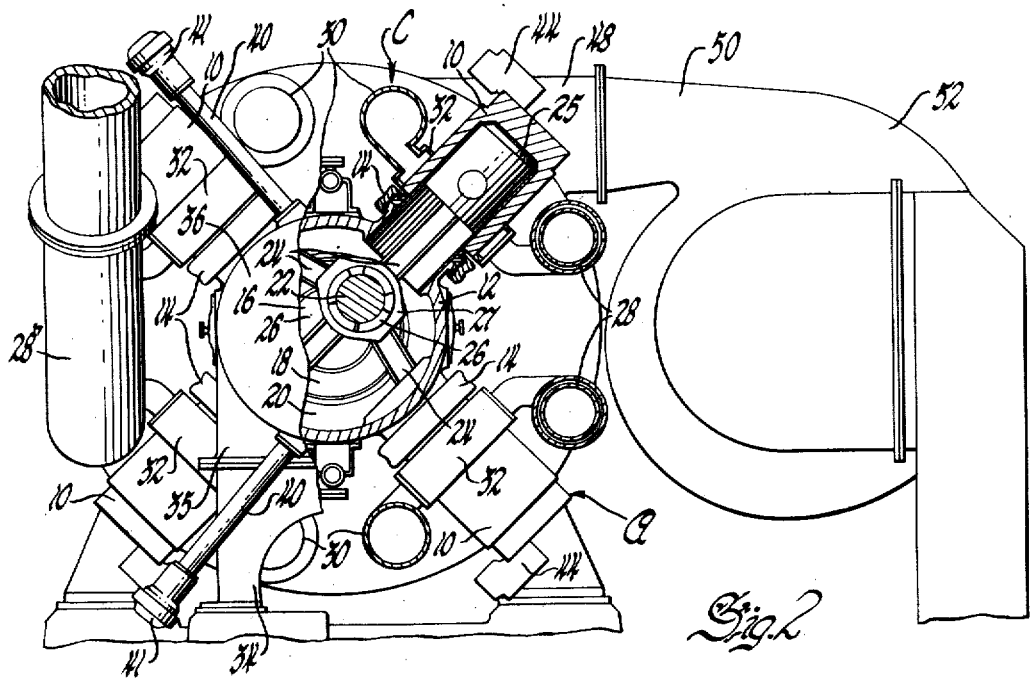
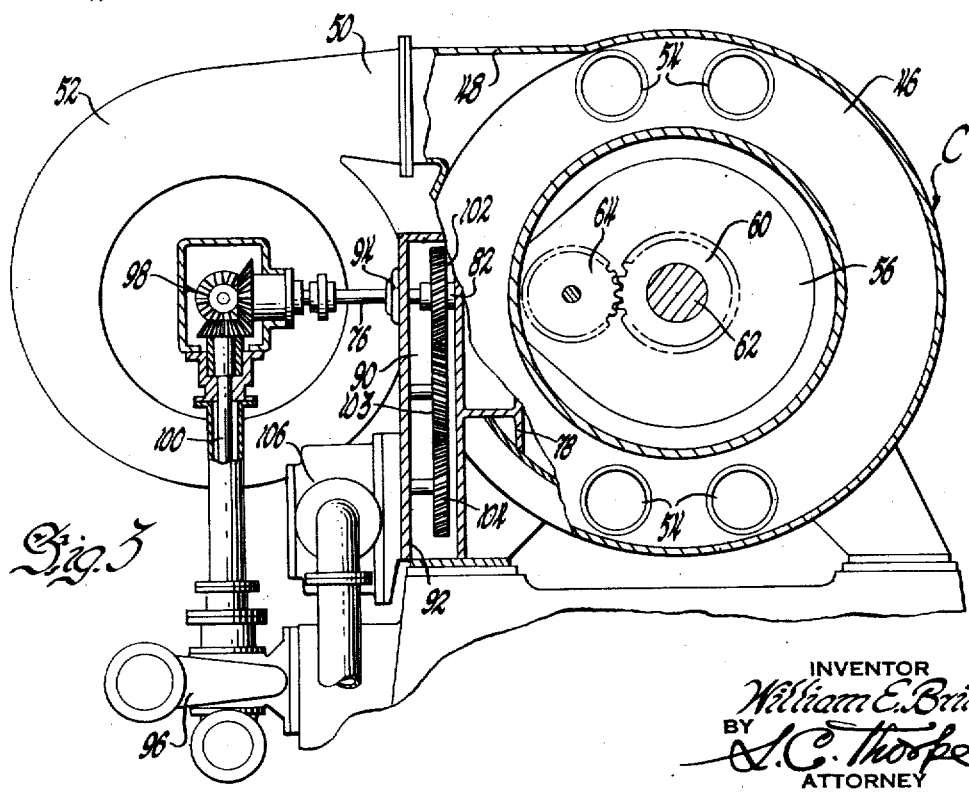
INVENTOR
William E. Brill
BY
J. C. Thorpe
ATTORNEY April 9, 1957   W. E. BRILL   2,787,994
ENGINE SUPPORT Filed Nov. 8, 1954   3 Sheets-Sheet 3

INVENTOR
William E. Brill
BY S. C. Thorpe
ATTORNEY

//  # United States Patent Office 2,787,994
Patented Apr. 9, 1957

2,787,994

ENGINE SUPPORT

William E. Brill, Cleveland, Ohio, assignor to General Motors Corporation, Detroit, Mich., a corporation of Delaware Application November 8, 1954, Serial No. 467,563

8 Claims. (Cl. 123—195)

This invention relates generally to a power plant and more particularly to the structural features thereof.

Among the principal objects of this invention is to provide a power-plant unit comprising an internal-combustion engine and a power-driven device with an improved supporting structure of simplified construction thereby obtaining a lighter more compact unit and facilitating manufacturing, assembling, and servicing of the engine with consequential savings in the costs of such operations.

A further and more specific object of the invention is to provide such a power plant with an interconnecting structural member which functions as a housing for the engine accessory drive gears enclosed thereby, a plenum chamber for distributing charging air to the intake manifolds of the engine, a support and outlet connection for the air-charging blower, a support for other engine accessories, and as an intermediate support for the adjacent ends of the engine and the power-driven device.

These and other objects of the invention will be more thoroughly understood from the following description of a preferred embodiment thereof in which reference is made to the accompanying drawings, in which:

Figure 2 is a view taken substantially on the line 2—2 of Figure 1 with portions thereof broken away and in section.

Figure 3 is a view taken on the line 3—3 of Figure 1 with portions thereof broken away and in section.

Referring more particularly to the drawings, the invention is illustrated in a power plant comprising a multi-row X-type two-cycle internal-combustion engine A which serves to drive a generator, pipe line fluid pump, etc., indicated by the letter B, which is attached thereto.

Figure 1:
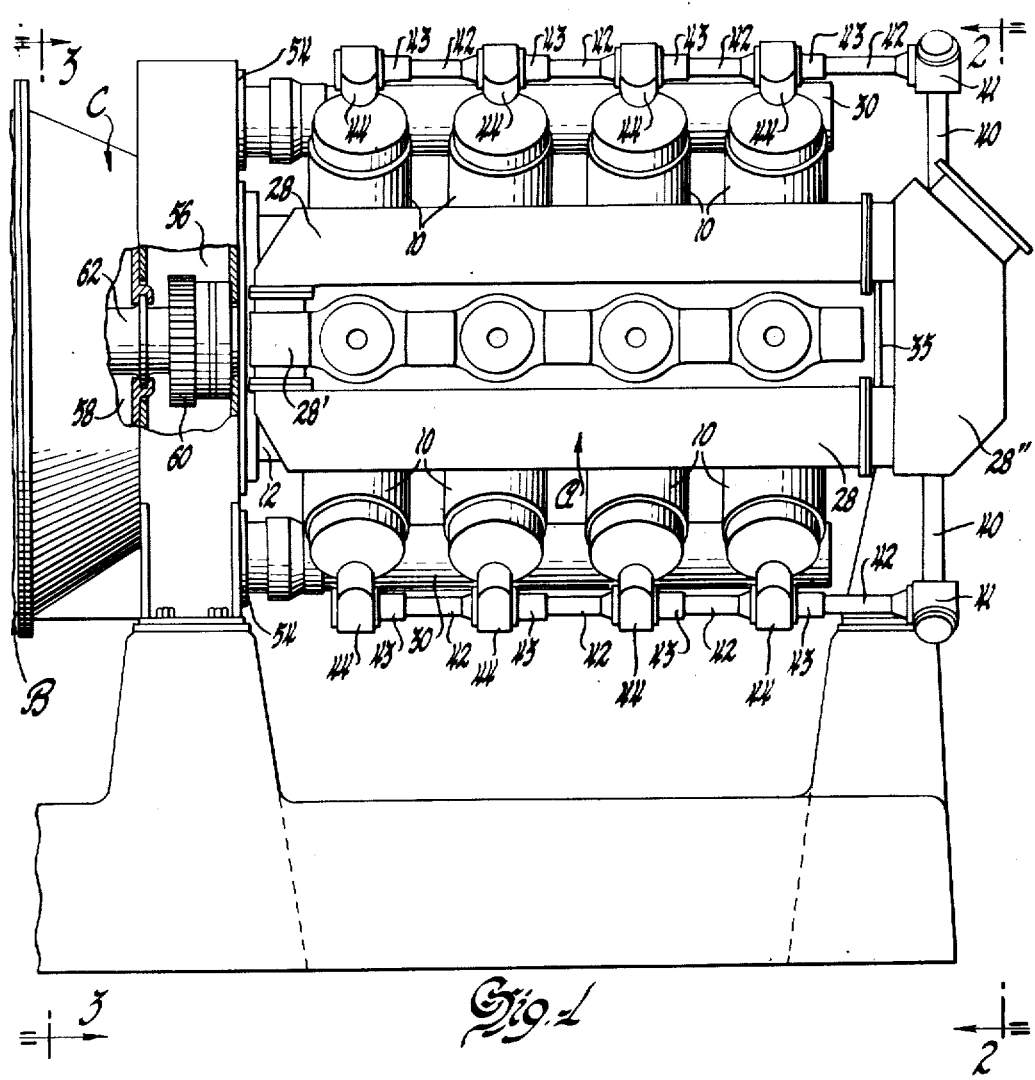
Figure 1 is a side view of an internal-combustion engine which forms a portion of a power plant embodying the invention.
Figure 4:
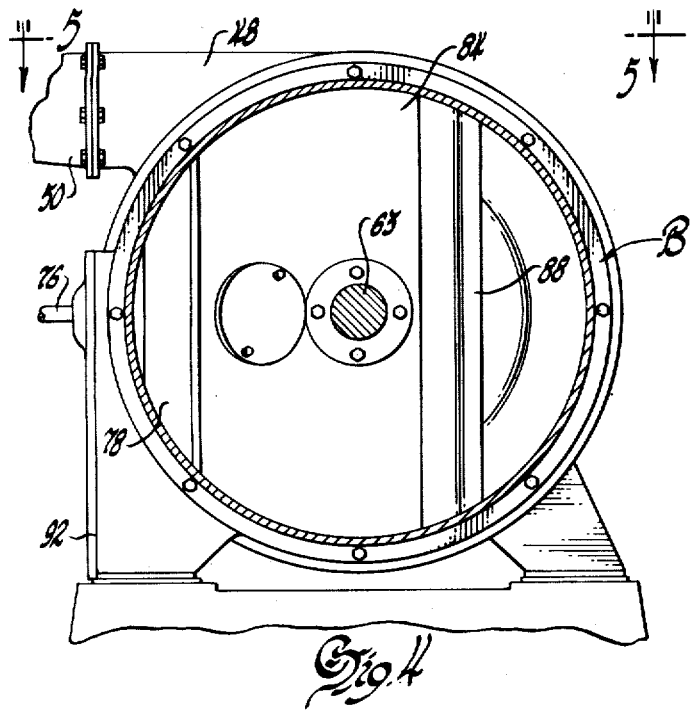
Figure 4 is a fragmentary sectional view taken substantially on the line 4—4 of Figure 5.
Figure 5:
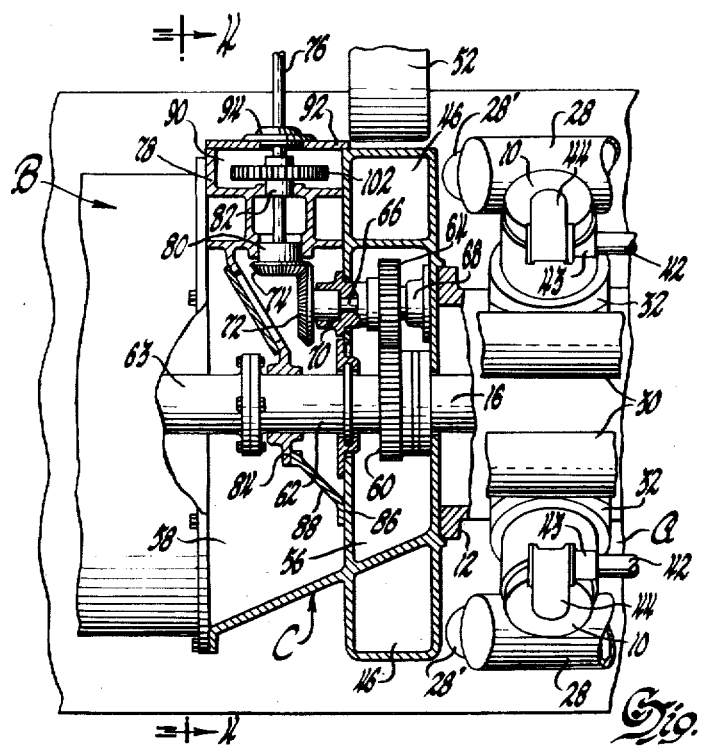
Figure 5 is a fragmentary elevational view taken substantially on the line 5—5 of Figure 4 with portions thereof broken away and in section.

As best seen in Figures 1 and 2, the engine A has a plurality of individual cylinders 10 which are suitably attached to a tubular crankcase 12 by split clamping rings 14. A crankshaft 16 extends axially of the crankcase and is rotatably journaled in bearings 18 which are mounted in bearing-supporting webs 20 formed integrally with the crankcase intermediate the cylinder rows. The crankshaft is provided with a crankthrow 22 for each cylinder row, and connecting rods 24 serve to interconnect the crankshaft throws with the engine pistons 25 which are reciprocably mounted in the individual cylinders 10. Slipper-type bearings 26 formed on the crankthrow ends of the connecting rods are maintained in bearing relation with the crankthrow by the clamping rings 27. Parallel runner-type exhausts and intake manifolds 28 and 30, respectively, extend axially of the engine and are connected to the respective exhaust and intake ports of the individual cylinders through divided annular duct members 32 embracing each cylinder adjacent its mounting on the crankcase. The exhaust manifolds 28 between adjacent cylinder banks are interconnected at one end by a crossover 28' and at their opposite end by a common discharge header 28". The individual cylinders 10 are supported solely by their connection through the tubular crankcase 12 which is preferably integrally cast or fabricated to provide a substantially rigid supporting member. The crankcase is in turn supported at its end adjacent the power-driven device B by a single member C which may be either cast or fabricated in a suitable manner. In accordance with the invention, the member C, in addition to serving as an interconnecting structural member and intermediate support for the adjacent ends of the engine and the power-driven device, also serves as a housing for certain of the engine accessory drive gears; an annular air plenum chamber for distributing scavenging air to the intake manifolds of the engine; and as a support and an outlet chamber for the scavenging air blower as well as a support for other engine accessories. The support for the other end of the engine crankcase 12 is provided by the members 34, 35, and 36 which also form a housing for additional accessory driving gears, not shown. These gears drive an articulated camshaft mechanism, not shown, which is mounted within a housing formed of telescopic members 40, 41, 42, 43, and 44, and which in turn actuates suitable valve or injector mechanisms, also not shown, mounted in the heads of the individual cylinders 10. Such an articulated camshaft and valve actuating mechanism is shown by my copending application S. N. 423,110; filed April 14, 1954.

The member C is portioned into three compartments including an outer annular air plenum chamber 46 which has an inlet 48 connected to the outlet 50 of the centrifugal blower 52 which is mounted thereon. The intake manifolds 30 are each connected to the plenum chamber 46 as indicated at 54. A second chamber 56 is formed inwardly of the plenum chamber, and a third chamber 58 is formed axially of the first and second chambers. The second chamber 56 serves as a housing for an accessory drive gear 60 which is mounted on a coupling shaft extension 62 of the crankshaft 16 which serves to interconnect the shaft 63 of the power-driven device therewith. The gear 60 drives a second gear 64 located within the chamber 56 and mounted on a shaft 66 which is rotatably journaled in parallel relation to the crankshaft by bearings 68 and 70 mounted in the member C. The shaft 66 extends into the third chamber 58 and a bevel gear 72 secured to the end thereof meshes with a second bevel gear 74 mounted on a shaft 76. The shaft 76 is journaled normal to the shaft 66 by the bearings 80 and 82, which are carried by transversely spaced webs of a cast or fabricated member 78 fitted within the third chamber of the member C, and then extends through an accessory gear compartment 90 formed between the members C, 78, and a cover plate member 92. In addition to being journaled in the bearings 80 and 82, the shaft 76 is also journaled by the bearing indicated at 94 in the cover plate 92 provided to close this compartment. The projection of the shaft 76 beyond the cover plate 92 is drivingly connected through a suitable bevel gear train indicated at 98 and shaft 100 to the impeller, not shown, of the scavenging and charging blower 52 and to the impeller, also not shown, of an accessory coolant pump or blower 96. A gear 102 mounted on the shaft 76 intermediate the bearings 82 and 94 and within the compartment 90 is drivingly connected by an idler gear 103 to the drive gear 104 of a second accessory pump 106 such as a pressure lubrication oil pump. The idler gear 103, the gear 104, and the pump 106 are all suitably mounted on the cover plate 92.

The member 78 has a depending web or flange portion 84 in spaced axial relation with the partition web 86 separating the first two chambers from the third chamber of the member C and which serves as a bearing support for the crankshaft extension 62 and as a housing cover for the bevel gears 72 and 74. An obliquely disposed plate 88 is provided to close the space between the webs 84 and 86.

From the foregoing description of one specific embodiment of the invention, it will be quite apparent that the several objects of the invention are accomplished by the present construction. It will also be apparent to those skilled in the art to which this invention pertains that various modifications and changes may be made therein without departing from the spirit and scope of the invention as defined in the following claims.

I claim:

1. A support structure for a multi-row radial engine having a plurality of cylinders individually secured to a rigid tubular crankcase and having a blower associated therewith for supplying a cylinder air intake charging pressure in excess of atmospheric pressure, said supporting structure including a member secured to one end of said crankcase and adapted to be mounted on a suitable base, said member including an outer annular air plenum chamber for supplying said pressurized intake air and an inner accessory drive gear compartment, the discharge of said blower being connected to said plenum chamber, and said member serving as the sole support for said blower.

2. An internal-combustion engine comprising, in combination, a tubular crankcase having a plurality of individual cylinders secured thereto, a crankshaft rotatably journaled in said crankcase and extending therethrough, a first supporting member secured to one end of said crankcase and a second supporting member secured to the opposite end thereof, both of said support members being adapted to mount said engine on a suitable base and comprising accessory gear drive casings having crankshaft-driven accessory drive gears suitably journaled therein, said support members constituting the sole means of support for said engine, and said first member including an air plenum for supplying intake air to said cylinders at a pressure in excess of atmospheric pressure.

3. An internal-combustion engine comprising, in combination, a tubular crankcase having a plurality of individual cylinders secured thereto, a first supporting member secured to one end of said crankcase and a second supporting member secured to the opposite end thereof, both of said support members being adapted to mount said engine on a suitable base and constituting the sole means of support for said engine, one of said members comprising an accessory gear drive casing having accessory drive gears suitably journaled therein and including an air plenum for supplying intake air to said cylinders at a pressure in excess of atmospheric pressure.

4. A multi-row radial engine comprising, in combination, a tubular crankcase having a plurality of individual cylinders secured thereto, a crankshaft rotatably journaled in said crankcase and extending therethrough, a first supporting member secured to one end of said crankcase and a second supporting member secured to the opposite end thereof, both of said support members being adapted to mount said engine on a suitable base and constituting the sole means of support for said engine, one of said members comprising an accessory gear drive casing having crankshaft-driven accessory drive gears suitably journaled therein and including an outer annular air plenum formed integrally therewith, a plurality of intake manifolds extending axially of said engine interconnecting said plenum chamber and said cylinders, and a blower mounted on said one member and driven by said drive gears, and the discharge of said blower being connected to said air plenum.

5. A power plant comprising, in combination, a multi-row radial engine having a tubular crankcase having a plurality of individual cylinders attached thereto and a crankshaft rotatably journaled therein and extending therethrough, an engine-driven device spaced axially of said engine, an intermediate support member interconnecting the adjacent ends of said device and the tubular crankcase of said engine and adapted to mount said ends above a suitable base, said member comprising a housing for crankshaft-driven accessory drive gears journaled therein and including an outer annular air plenum chamber, blower means connected to and supported by said one member, and a plurality of intake manifolds extending axially of said engine and interconnecting said plenum chamber and said cylinders for supplying pressurized intake air thereto.

6. An internal-combustion engine comprising, in combination, a tubular crankcase having a plurality of individual cylinders secured thereto, a first supporting member secured to one end of said crankcase and a second supporting member secured to the opposite end thereof, both of said support members being adapted to mount said engine on a suitable base and constituting the sole means of support for said engine, at least one of said members comprising an accessory gear drive casing and having accessory drive gears suitably journaled therein and one of said members forming an air plenum chamber for supplying intake air to said cylinders at a pressure in excess of atmospheric pressure.

7. An internal-combustion engine as set forth in claim 6 in which said air plenum chamber is annular in form and including blower means adapted to introduce pressurized air into said plenum chamber with vertical flow.

8. A multi-row radial engine comprising, in combination, a tubular crankcase having a plurality of individual cylinders secured thereto, a first supporting member secured to one end of said crankcase and a second supporting member secured to the opposite end thereof, both of said support members being adapted to mount said engine on a suitable base and constituting the sole means of support for said engine, one of said members comprising an accessory gear drive casing having crankcase-driven accessory drive gears suitably journaled therein and the other of said members forming a plenum chamber, a plurality of intake manifolds extending axially of said engine and interconnecting said plenum chamber with said cylinders, and blower means associated with said plenum chamber and adapted to introduce pressurized air therein.

References Cited in the file of this patent

UNITED STATES PATENTS

| 2,353,231 | Ginn | July 11, 1944 |
| 2,390,960 | Raybon | Dec. 11, 1945 |
| 2,660,989 | Schnurle et al. | Dec. 1, 1953 |

UNITED STATES PATENT OFFICE
CERTIFICATE OF CORRECTION

Patent No. 2,787,994                                                          April 9, 1957

William E. Brill

It is hereby certified that error appears in the printed specification of the above numbered patent requiring correction and that the said Letters Patent should read as corrected below.

Column 4, line 45, for "vertical" read -- vortical --.

Signed and sealed this 29th day of July 1958.

(SEAL)
Attest:

KARL H. AXLINE
Attesting Officer

ROBERT C. WATSON
Commissioner of Patents